United States Patent
Parker

(10) Patent No.: US 8,793,610 B2
(45) Date of Patent: Jul. 29, 2014

(54) SYSTEM AND METHOD FOR WEB-BASED MAPPING ON TOUCH-SCREEN COMPUTING DEVICE

(76) Inventor: Cheryl Parker, San Francisco, CA (US)

( * ) Notice: Subject to any disclaimer, the term of this patent is extended or adjusted under 35 U.S.C. 154(b) by 166 days.

(21) Appl. No.: 13/548,374

(22) Filed: Jul. 13, 2012

(65) Prior Publication Data
US 2012/0278752 A1    Nov. 1, 2012

Related U.S. Application Data

(63) Continuation-in-part of application No. 13/077,379, filed on Mar. 31, 2011.

(60) Provisional application No. 61/329,321, filed on Apr. 29, 2010.

(51) Int. Cl.
| | |
|---|---|
| *G06F 3/048* | (2013.01) |
| *G06F 3/0488* | (2013.01) |
| *G06F 17/30* | (2006.01) |
| *G06Q 30/06* | (2012.01) |

(52) U.S. Cl.
CPC ........ *G06F 17/30241* (2013.01); *G06F 3/0488* (2013.01); *G06Q 30/0603* (2013.01)

USPC ............ 715/790; 715/780; 715/781; 715/782

(58) Field of Classification Search
USPC .......................... 715/780, 781, 782, 790, 794
See application file for complete search history.

(56) References Cited

U.S. PATENT DOCUMENTS

| | | | |
|---|---|---|---|
| 2004/0119759 A1* | 6/2004 | Barros | .......................... 345/853 |
| 2008/0059889 A1 | 3/2008 | Parker et al. | |
| 2011/0218985 A1 | 9/2011 | Camper | |

* cited by examiner

*Primary Examiner* — Andrey Belousov
(74) *Attorney, Agent, or Firm* — Law Offices of Steven H. Meyer, LLC

(57) ABSTRACT

A displayed map is overlaid with a map-based graphical user interface that provides a polygon layer and a point layer which work in tandem to simultaneously display both aggregated and disaggregated data across the displayed map. A selection of one of the regions of the polygon layer is received at the touch display from the user, and a request is submitted to a remote service administering the dataset for items in the dataset that reside in the selected region. The items in the dataset that reside in the selected region are received from the remote service, and the received items are rendered as points in the point layer, where the rendered points are bounded by the selected region.

11 Claims, 8 Drawing Sheets

SYSTEM AND METHOD FOR WEB-BASED MAPPING ON TOUCH-SCREEN COMPUTING DEVICE

CROSS-REFERENCE TO RELATED APPLICATION

The present application discloses subject matter related to and is a continuation-in-part of U.S. patent application Ser. No. 13/077,379, filed on Mar. 31, 2011, and entitled "System and Method for Geographic Based Data Visualization and Extraction", hereby incorporated by reference in its entirety, which claims priority from U.S. Provisional Pat. Application No. 61/329,321, filed on Apr. 29, 2010, also hereby incorporated by reference in its entirety.

FIELD

The present disclosure relates to performing web-based mapping services and functions on a touch-screen computing device or the like. More particularly, the present disclosure relates to performing such mapping services and functions in a manner more suitable to touch-based inputting functionality inherent in such a touch-screen computing device or the like. Accordingly, map searching and other mapping chores may be performed with the touch-screen computing device in a more organic and intuitive manner.

BACKGROUND

Touch-screen computing devices have been introduced into general use only in the last few years, and yet have already become accepted and embraced by the general public to such an extent that one may wonder why such touch-screen computing devices weren't previously available. As is generally known, such a touch-screen computing device ("touch device") typically encompasses all required computing functionality necessary to acquire digital content from a remote source, typically by way of a wireless broadband connection or the like, and to render the acquired content, or else to render content already present in a computing memory or the like on the touch device. As should be appreciated, such rendering may include displaying fixed or moving images on a display and/or producing audio on attached speakers or earphones, among other things.

Typically, the touch device is especially light-weight and portable, perhaps weighing on the order of a pound or so, and is on the order of a third of an inch in thickness, if that. In any case, one hallmark of such a touch device is that most if not all inputs thereinto are performed by way of touch-based gestures imparted directly onto and sensed by the display of the touch device ("touch display"). Typically, performing such an input by touch-based gesture involves touching with a finger or the like at a particular area on the touch display in order to actuate a function associated with the particular area. Thus, if the particular area is a displayed selection button, touching the touch display at the displayed selection button actuates same. Likewise, if the particular area is a section of a displayed map, double-tapping the touch display at the section of the displayed map may zoom in on the section of the map. Currently, one especially popular touch device is the iPad touch device developed and marketed by Apple Inc. of Cupertino, Calif., although other touch devices also exist.

Using touch-based gestures directly on a touch display to input commands into a touch device has been found to be highly intuitive. In fact most users of such touch devices do not even require reference to a user manual or the like in order to operate same. Nevertheless, the use of such touch-based gestures directly on a touch display to input commands presents some challenges to the user, particularly where the input command is intended to be precisely located, or where the input command includes a textual element, among other things.

With regard to the former, it is to be appreciated that a touch-based gesture applied directly by the tip of a finger nevertheless involves contact over a relatively large extent between the finger and the touch display, perhaps on the order of a square inch or so, and interpreting such contact can be problematic if the intent of the contact is ambiguous. Put simply, using a finger on a touch display is not nearly as accurate as moving a cursor icon or the like on the touch display by way of a mouse or the like. With regard to the latter, it is to be appreciated that typing text on a touch display by way of a displayed touch-screen keyboard or the like does not provide the tactile feedback obtained from a hardware keyboard. As a result, typing text on a touch device can be perceived as awkward, and is thus best minimized or avoided when possible. Accordingly, some challenges posed by graphical user interface (GUI) design on a touch device include minimizing the use of a touch-screen keyboard displayed thereon, and increasing the surface area of touchable/selectable elements such that a user can touch and select items with more accuracy and less ambiguity.

Searching on a displayed map on the touch display of a touch device can in particular be a trying experience. In particular, map-based searching is an area sorely in need of new principles for touch-screen graphical user interface design. Reasons are many and varied and include the following, among others. For one thing, inputting parameters for touch-screen map-based searching typically still requires the use of traditional "text input" boxes, which may be generated according to known HTML (Hyper-Text Markup Language) forms. Thus, a user is likely required to use the aforementioned touch-screen keyboard on the touch display to enter search criteria for both location-based and descriptive criteria. Furthermore, if a user wants to refine a search by entering additional descriptive criteria or re-phrased descriptive criteria, additional usage of the touch-screen keyboard ensues.

For another thing, touch-screen mapping interfaces typically do not use screen 'real estate' efficiently. Put simply, screen area or 'real estate' is a valuable commodity and yet is oftentimes squandered, especially when a displayed map uses most of the available screen area on a touch display, leaving little if any other room on the touch display for entering search criteria, textually or otherwise, other than rudimentary navigation inputs such as zooming and panning. Ideally, search criteria for mapping should be inputted directly onto the map when possible by appropriate gestures or the like, and the map GUI should effectuate such direct map inputs.

For still another thing, it is to be appreciated that a touch device typically includes a mobile device browser with relatively limited storage and wireless bandwidth transfer capabilities, such that the amount of data that can be delivered in response to any web-based request is likewise relatively limited. Thus, if the geographic area queried by map-based searching is relatively large, perhaps on the order of multiple cities, and/or if the results returned by such map-based searching is relatively large, perhaps on the order of thousands or so, then the size of the returned results may be considered excessive in terms of bandwidth and ability to be consumed in a reasonable amount of time.

Accordingly, a need exists for a system and method for providing enhanced web-based mapping services and functions on a touch-screen computing device or the like. In particular, a need exists for such a system and method where mapping services and functions are performed in a manner more suitable to touch-based inputting functionality inherent in such a touch-screen computing device or the like. Further, a need exists for such a system and method where map searching and other mapping chores are performed with the touch-screen computing device in a more organic and intuitive manner.

SUMMARY

The aforementioned needs are satisfied by a system and method in which a computing system displays a map on a display associated with the computing system and overlays the displayed map with a map-based graphical user interface (GUI). The GUI provides one or more related translucent views corresponding to the displayed map, where each view is associated with a particular dataset. The view also provides interlocked queries and analysis tools to probe the dataset.

The view comprises a polygon layer corresponding to the displayed map and a point layer corresponding to the displayed map, where the polygon layer and the point layer work in tandem to simultaneously display both aggregated and disaggregated data across the displayed map. In particular the point layer overlays the displayed map and shows for each of a plurality of specific items a location of the specific item on the displayed map. Each shown item is tied to and listed in a selectable point list displayed by the GUI on the display. Likewise, the polygon layer overlays the displayed map and shows a thematic display of information aggregated to regions on the displayed map. The aggregated information for each region is derived from the items in the point layer located on the displayed map within the region.

A selection of one of the regions of the polygon layer is received at the touch display from the user, as is descriptive criteria relating to an area of interest of the user, and a request is submitted to a remote service administering the dataset for items in the dataset that reside in the selected region and that match the received descriptive criteria. The items in the dataset that reside in the selected region and that match the received descriptive criteria are received from the remote service, and the received items are rendered as points in the point layer, where the rendered points are bounded by the selected region and represent entities which meet the received descriptive criteria.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
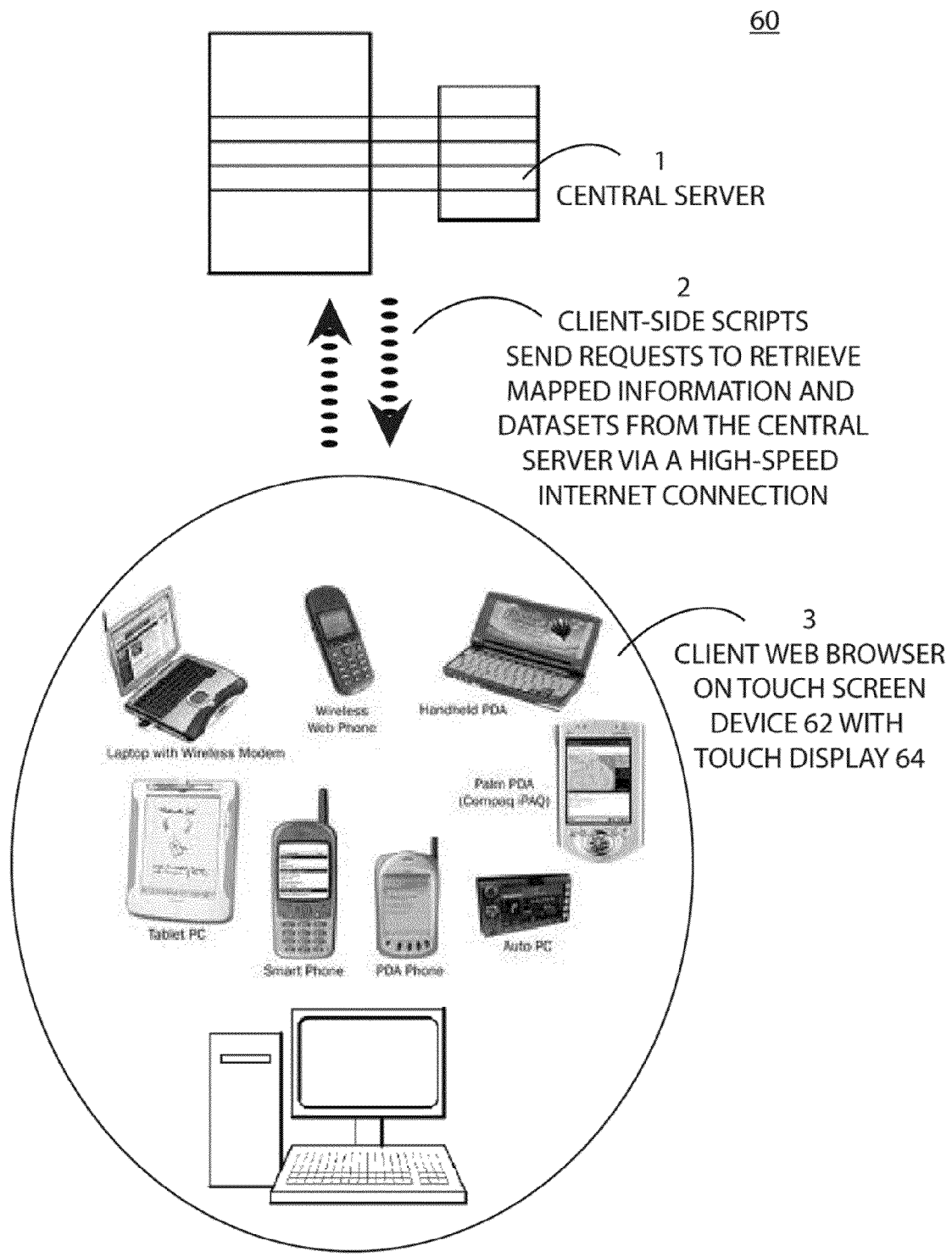
FIG. 1 is a block diagram of a central server and a variety of client touch screen computing devices ("touch devices")

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, aspects described by the plural of that term are also contemplated. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the relevant art. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

Figure 8:
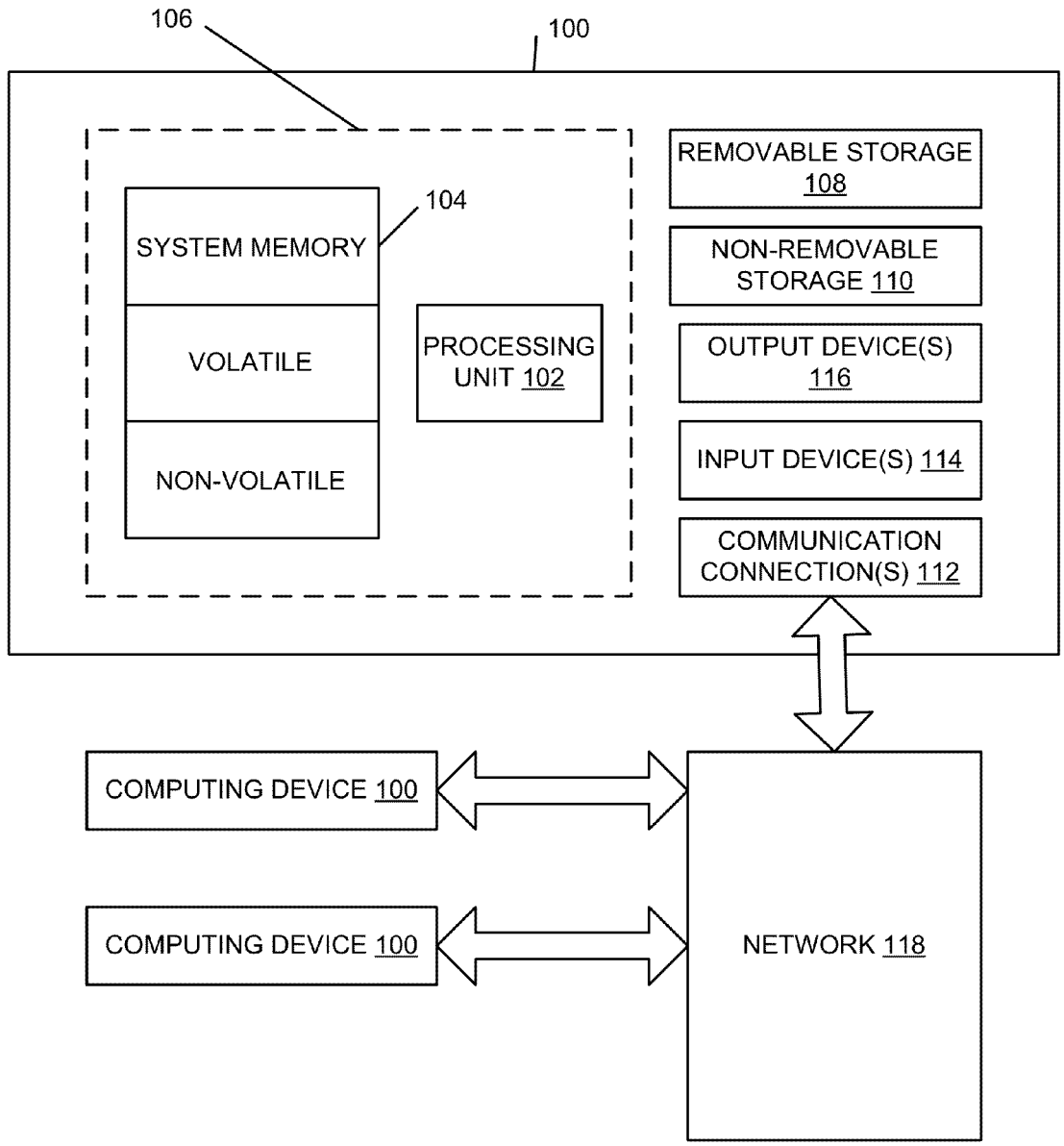
FIG. 8 is a block diagram of an example of a computing environment within which various embodiments of the present innovation may be implemented.

FIG. 8 is set forth herein as an exemplary computing environment in which various embodiments of the present invention may be implemented. The computing system environment is only one example of a suitable computing environment and is not intended to suggest any limitation as to the scope of use or functionality. Numerous variations of general purpose and special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, one system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 8 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 8 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. In the present disclosure, it is contemplated that the touch input device is incorporated in the display in a manner that is generally known to the relevant public. All these devices are generally known to the relevant public and therefore need not be discussed in any detail herein except as provided.

Notably, computing device 100 may be one of a plurality of computing devices 100 inter-connected by a network 118, as is shown in FIG. 8. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including Vol P) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 8 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Web-Based Mapping on Touch-Screen Computing Device—Overview

As set forth in more detail in the aforementioned related U.S. patent application Ser. No. 13/077,379, which again is hereby incorporated by reference in its entirety, a map-based GUI (Graphic User Interface) may overlay a map displayed on a computing device, and provide a predefined view of data relating to the underlying base map. Thus, the view represents a themed "lens" into a locality as represented by the underlying map, where the lens is associated with a specific dataset, such as businesses, jobs, land parcels, energy use, etc., and provides interlocked queries, thematic mapping, and temporal and spatial analysis tools to probe the dataset. The view may include layers including a polygon layer and a point layer, both of which work in tandem to simultaneously display both aggregated and disaggregated data across the map.

The point layer overlaying the map shows the location of specific (i.e., disaggregated) elements such as businesses, jobs, solar panels, etc. as per pre-set or user-defined search criteria. For example, a business point layer may include businesses, and a solar energy point layer may include permits for solar panel installations. The mapped points may be tied directly to a selectable point list, enabling a user to select an item from the list and simultaneously select the corresponding mapped item or vice versa. Selecting an item from the list or map may also open detail box which displays more detailed information about the selected point element.

The polygon layer overlaying the map provides a colored or otherwise differentiated thematic display of information aggregated to regions on a map, such as census tracts, city blocks, neighborhoods, etc. Typically, although by no means necessarily, each polygon encompasses such a region and is represented on the map according to an aggregation of elements in the point layer, where the aggregated elements reside within the region of the polygon. For example, if each polygon represents a census district and the aggregation represents population density based on the corresponding elements in the census district, then it may be that each polygon is color-coded according to a predefined population density color scale.

Such a GUI may be interactive, in that changing any one criteria or variable automatically redraws both polygon and point layers. For example, in a view which displays the location of businesses, the regions represented within the polygon layer may be colored according to the number of total businesses within a user-specified industry sector, with regions having a greater concentration of businesses rendered darker in value and those with fewer businesses, rendered lighter. The point layer in tandem may show the actual location of the specific businesses within that selected industry sector relative to the regional boundary. Thus, it may be that a selection to render the points in a relative manner may cause each point to be displayed as a spike, for example, with spike height being determined by number of employees at each establishment, thereby immediately showing the precise location of the largest employers within the colored region.

A touch-screen computing device ("touch device") with a touch-actuated touch display provides a new opportunity for map-based search input: that of simply touching the map as rendered on the touch display to enter location-based search criteria. Polygons overlaying an interactive map rendered on the touch display (such as a map provided by the "Google Maps" service as provided by Google Corp. of Mountain View, Calif.) and representing pre-defined regions on the map (such as cities and neighborhoods) provide relatively large easily discernible surfaces. Accordingly, each such polygon as overlaid on the map on the touch display lends itself to easily being selected by simply touching the polygon (i.e., touching the touch display at the displayed polygon) with a finger or the like. The interlocked point/polygon map layers in the aforementioned GUI serve as an especially suitable medium for this touch display-based map search input. In particular, any selected polygon automatically displays the associated points (representing entities such as businesses) which both match the descriptive criteria and are situated inside the selected region/polygon.

Thus, a query is initiated by touching a polygon, query results are delivered in response thereto, and client-side functions analyze the results and group same into sub-categories which are dynamically rendered within a dropdown selectable filter list. This dynamically-generated list of filters subsequently enables a user to quickly refine the query by tapping on a sub-category in the list, rather than re-typing a new category into a text box. The filter list is generated on the touch device so that results for the refined query are provided near-instantly.

Combining interlocked point/polygon map layers with dynamically-generated filters enables efficient use of touch display real estate as an interactive GUI for user input, minimizes the need to use a touch-screen keyboard, and takes greater advantage of touch-as-input which is available on a touch device. Also, by effectively breaking a displayed map into a series of smaller, selectable polygons, the size of a search is greatly reduced, given that the user is only searching within a selected one of several smaller polygons rather than the whole visible map extent. Moreover, the dynamic filtering of any list of selected/returned items provides a mapping interface which is especially suited to a touch device, enabling fast repetitive searches of a large geographic area by simply touching the screen and selecting new polygons.

Web-Based Mapping on Touch-Screen Computing Device-Details

Turning now to FIG. 1, it is seen that the present invention may be implemented by way of a central server 1 or the like and is available as a fully functioning software and/or hardware system 60 available via most any web browser 3 or the like on a touch screen device 62 with a touch display 64, or the like. All major databases for the system 60 reside on the central server 1 and are passed to the client web browser 3 of the device 62 via a high speed Internet connection or the like. More precisely, client side scripts from the web browser 3 send requests 2 to the central server 1 to retrieve information for maps, businesses, demographics, and other statistics which are to be displayed through the web browser 3 on the display 64.

Figure 2:
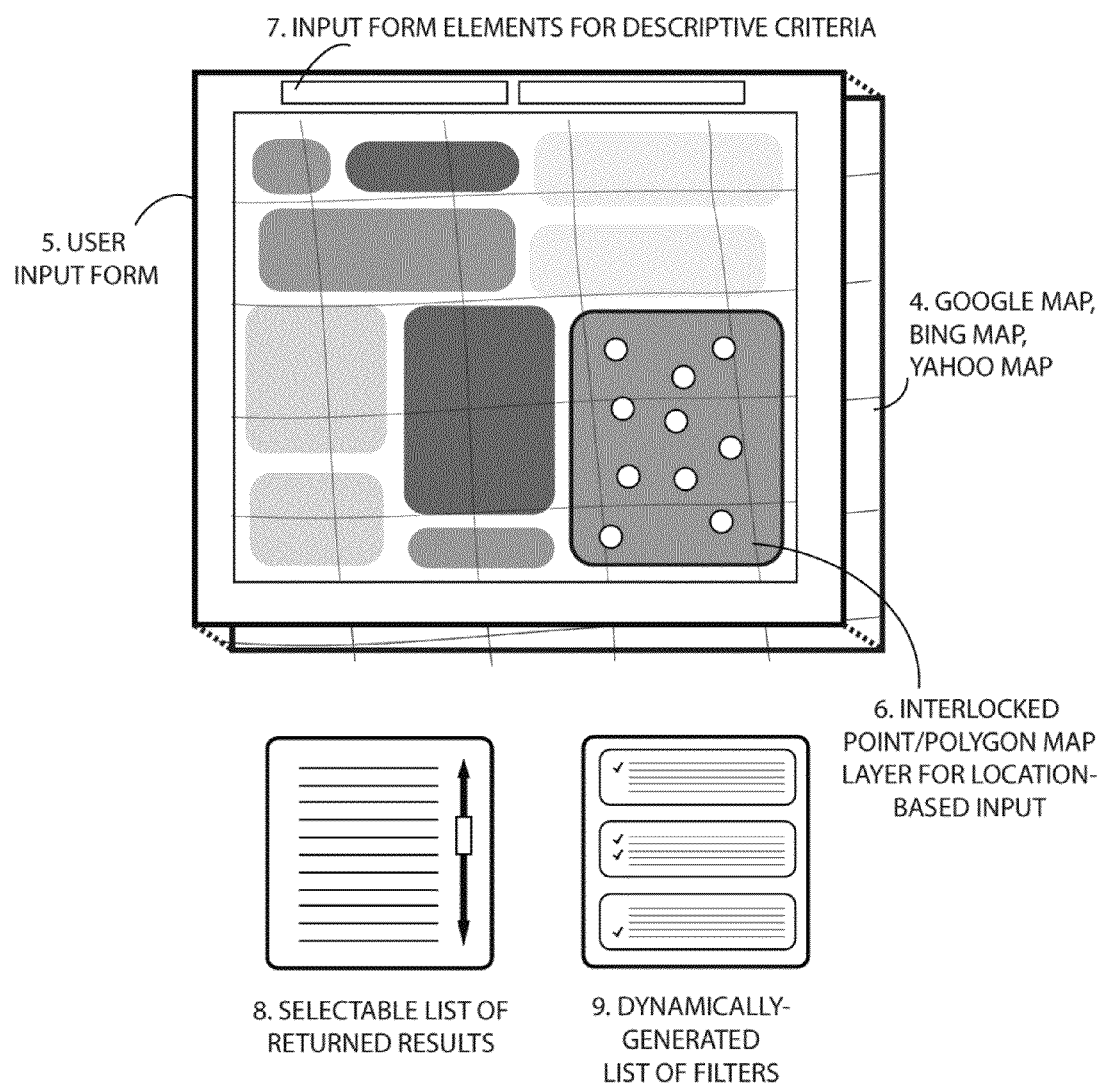
FIG. 2 is a block diagram of major system components of a mapping interface for a typical touch device.

More specifically, referring to FIG. 2, the system includes the following components: an interactive map (such as the Google, Bing or Yahoo Map available from the respective map service) 4; a user input form 5, including (a) interlocked point/polygon map layers 6 which overlay the interactive map 4 and (b) input elements for descriptive criteria 7 (such as a text box or a selectable drop-down list); a selectable list of returned results 8; and a dynamically-generated list of filters 9 which is generated client-side 3, and derived based upon sub-classifying the items in the list of returned results 8.

The interlocked point/polygon map layer 6, selectable list 8 and general map functionality (such as navigation and zooming) incorporate the techniques described in the related U.S. patent application Ser. No. 13/077,379. The new aspects introduced in the present disclosure include (a) fully integrating the act of touching a polygon into the execution of a user input form 5, (b) a list of filters 9 that are dynamically generated client-side 3 based upon the returned results, and (c) the combination of these two elements working in tandem. These new elements are described in detail below.

Figure 3:
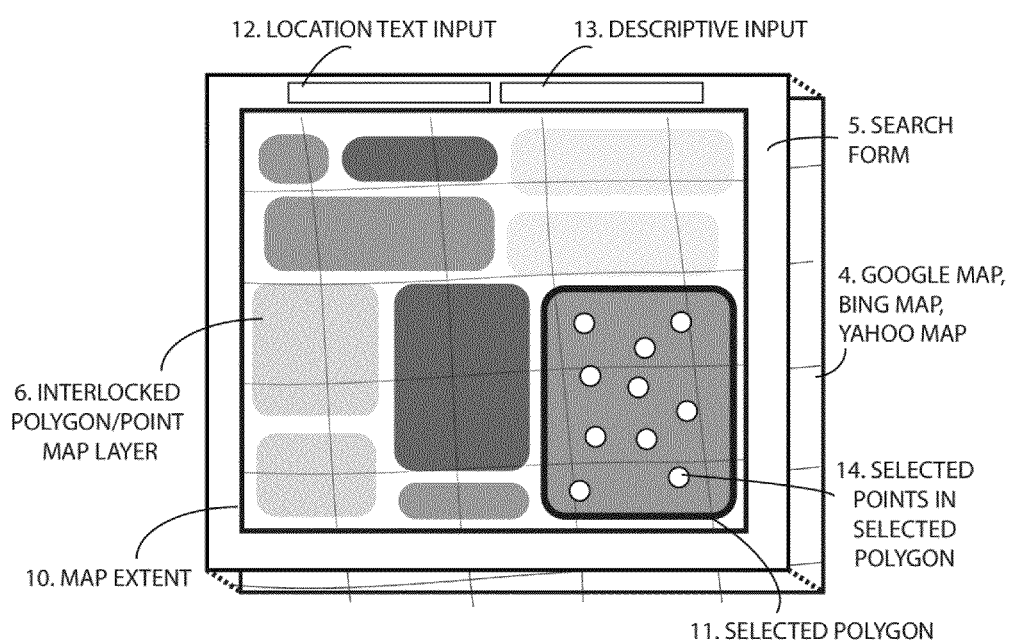
FIG. 3 is a block diagram illustrating touchable polygons as an integral part of the search form in accordance with various embodiments of the present innovation.

Referring to FIG. 3, the interlocked point/polygon map layer 6 is an integral part of the search form 5, and serves as the medium for capturing location-based criteria. The point/polygon map layer 6 is translucent, perfectly overlays an interactive map 4 (such as a Google Map) and represents the myriad of boundaries of regions and districts within the viewable map extent 10. Each polygon represents a known region, such as a city or a district, and provides a large, easily touchable surface area on top of the map. The act of touching the map automatically selects a polygon 11, simultaneously highlighting same and executing the search, posting the form's criteria to the server 1.

This interlocked point/polygon layer 6 is directly tied to a text input box for location 12, such that when a polygon is touched/selected 11, the text input box is automatically populated 12 and, conversely, when a user types a location into the text input box 12, the corresponding polygon is automatically selected 11. The text input box for location 12 is auto-fill and, as such, a user only needs to enter a couple of letters and a drop-down list can expeditiously suggest a list of locations from which to tap and select.

Another input element on the user input form 5 captures descriptive criteria 13 (such as business type). This descriptive input element 13 may be a text input box or a dropdown list of selectable criteria.

Given that the polygon layer 6 is interlocked with the point layer 6 (as described by techniques in the aforementioned related patent application), the returned results are portrayed as points 14 that are bounded by the selected polygon 11. This set of points represents entities which meet the descriptive criteria 13 passed by the user input form 5 upon execution of the search.

Figure 4:
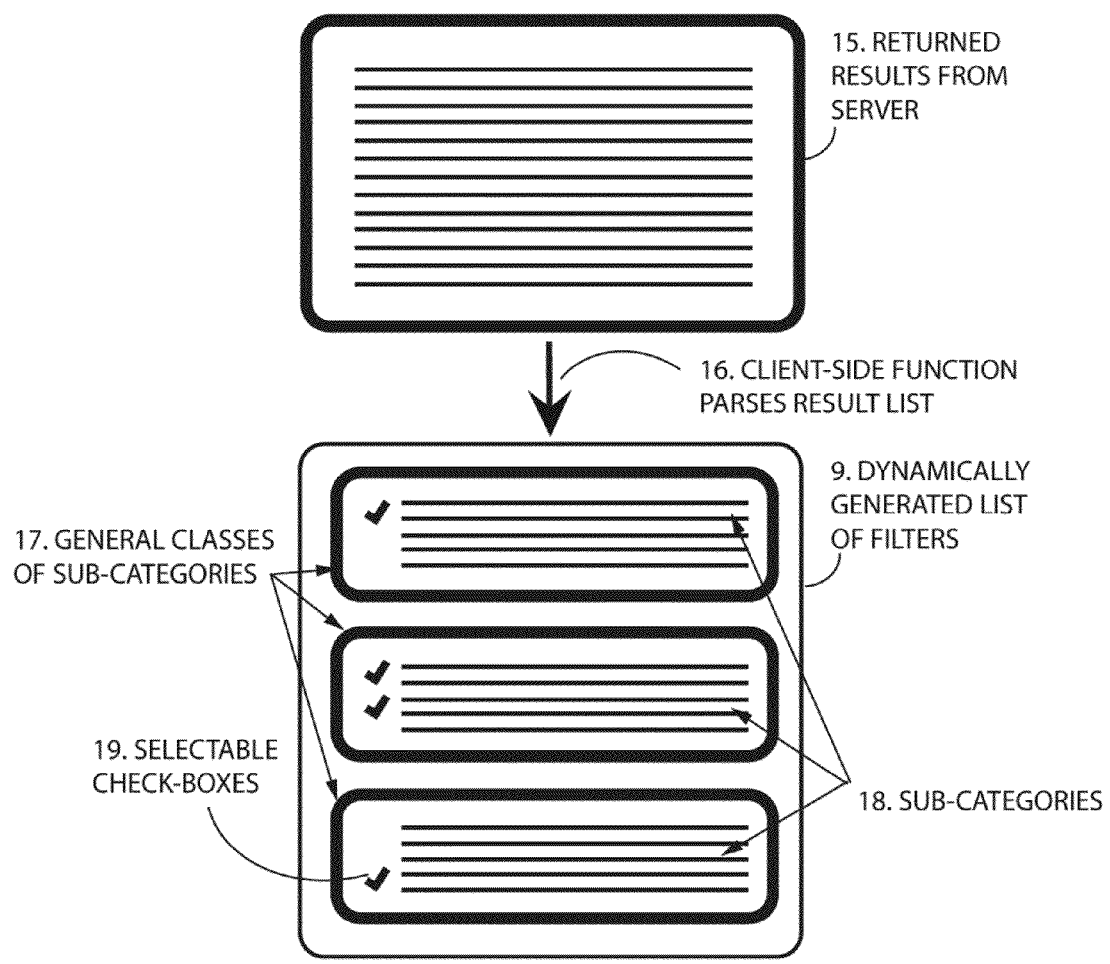
FIG. 4 is a block diagram of a dynamically rendered filter list in accordance with various embodiments of the present innovation.

Referring to FIG. 4, a filter list 9 is dynamically generated upon the return of results from the server 1. As soon as results are returned 15, a client-side function is executed 16 which parses the list of results to break same into smaller descriptive sub-categories 18. Depending upon the list contents, there may be several general classes 17 of smaller sub-categories 18. Thus, for example, a list of businesses may be broken into two general classes of business size and business type. These general classes 17, in turn, may be split into a series of sub-categories 18, such as business size ranges (e.g., 1-10 employees, 11-50 employees, etc.) and sub-types (e.g., cafes, coffee shops, diners, etc.). This enables a user to refine the list of returned results 15 by both size and type of business.

The dynamically generated filter list 9 is presented to the user as a drop-down list of selectable items, enabling the selection of more than one filter at a time via check boxes 19. Given that this list is generated client-side 3 and the returned list of results 15 is saved client-side 3, the act of checking/un-checking 19 this list by tapping one's finger yields immediate re-rendering of both the point/polygon map layer 6 and selectable list 8.

Figure 5:
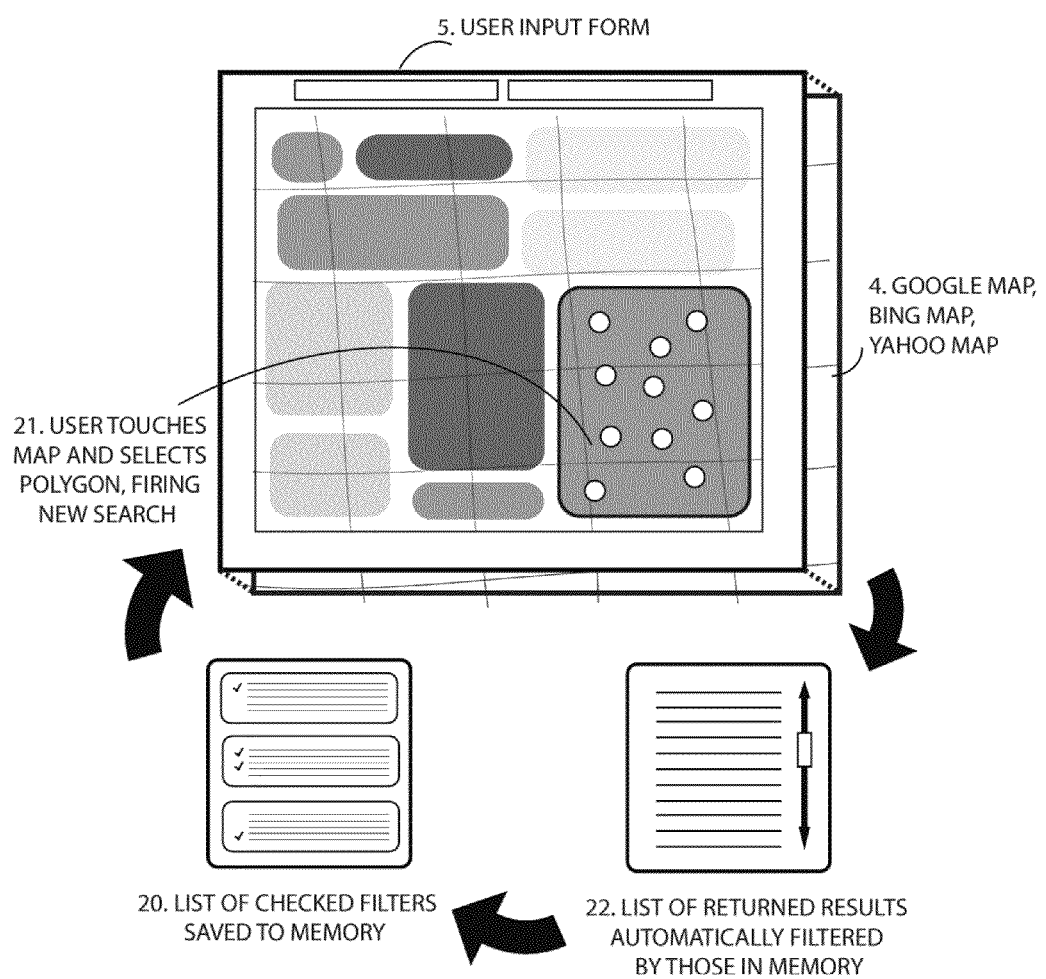
FIG. 5 is a block diagram showing the relationship between the touchable polygons and dynamically rendered filter list of FIG. 5 in accordance with various embodiments of the present innovation.

Referring to FIG. 5, the interlocked point/polygon layer 6 works in tandem with the dynamically generated list of filters 9 to enable a rapid succession of touch-based searches. The list's checked filters 19 are saved to memory 20, and so the next time a new search is fired 21 (via selecting a polygon), the returned results 22 will immediately be filtered according to these chosen filters 20. As a consequence, a user is able to quickly search a large geographic area using highly refined criteria, firing a new search simply by touching the map 21 and selecting new regions in rapid succession. Very little if any keyboard input or the like is necessary.

Figure 6:
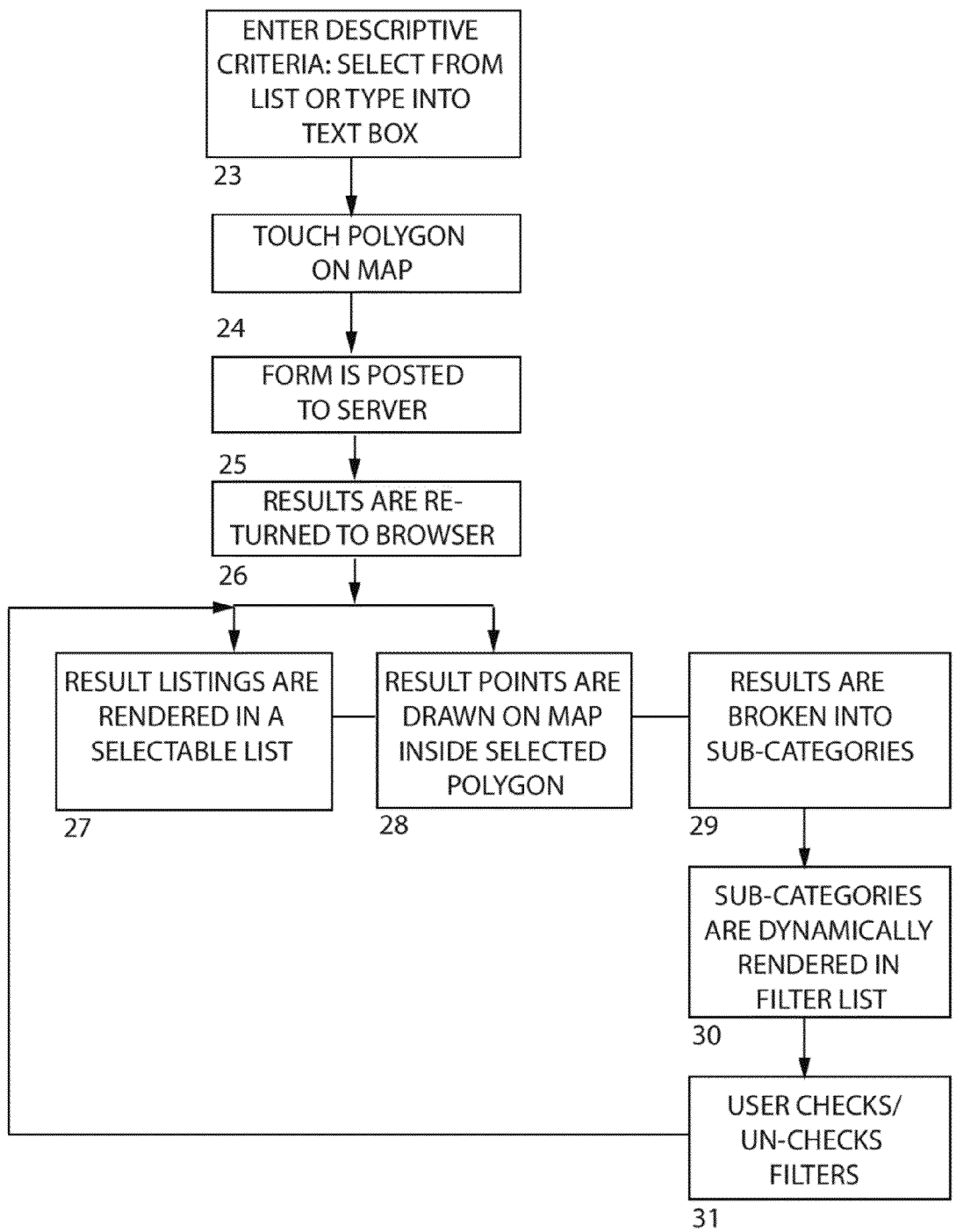
FIG. 6 is a flow diagram showing the initial search sequence performed with the touch device of FIG. 3 in accordance with various embodiments of the present innovation.

Referring to FIG. 6, in order to set up the initial search, a user first must enter descriptive criteria 23 (such as the type of business) via the descriptive input element 13, either selecting from a drop-down list of pre-defined categories (such as industry sectors) or by typing a keyword into the textbox via the keyboard. This descriptive criteria search input gets saved to memory (on the client-side 3), so the user does not need to re-enter the same criteria for subsequent searches. After input is entered 23, the user then touches the map to select a polygon 24 (representing, for example, a city or a neighborhood). The query is then processed by the server 25, and results are returned to the browser 26 as both a displayed list of results 27 and as points rendered on the map within the boundary of the selected polygon 28.

Upon the return of results, the result list is also processed client-side 3 and analyzed to determine smaller sub-categories 29. These sub-categories 29 automatically populate a dynamically-generated drop-down list of selectable filters 30. This dynamically generated list of filters 30 acts on the client-side 3, so by checking/un-checking sub-categories on this list 31, a user is able to quickly fire repetitive client-side 3 sub-queries which, in turn, instantly furnish results in the form of points 28 on the map and an accompanying list of results 27. Every time the user checks/un-checks a filter from the dynamic filter list 31, the map and list will be re-rendered, providing instant visual feedback 27-30.

Figure 7:
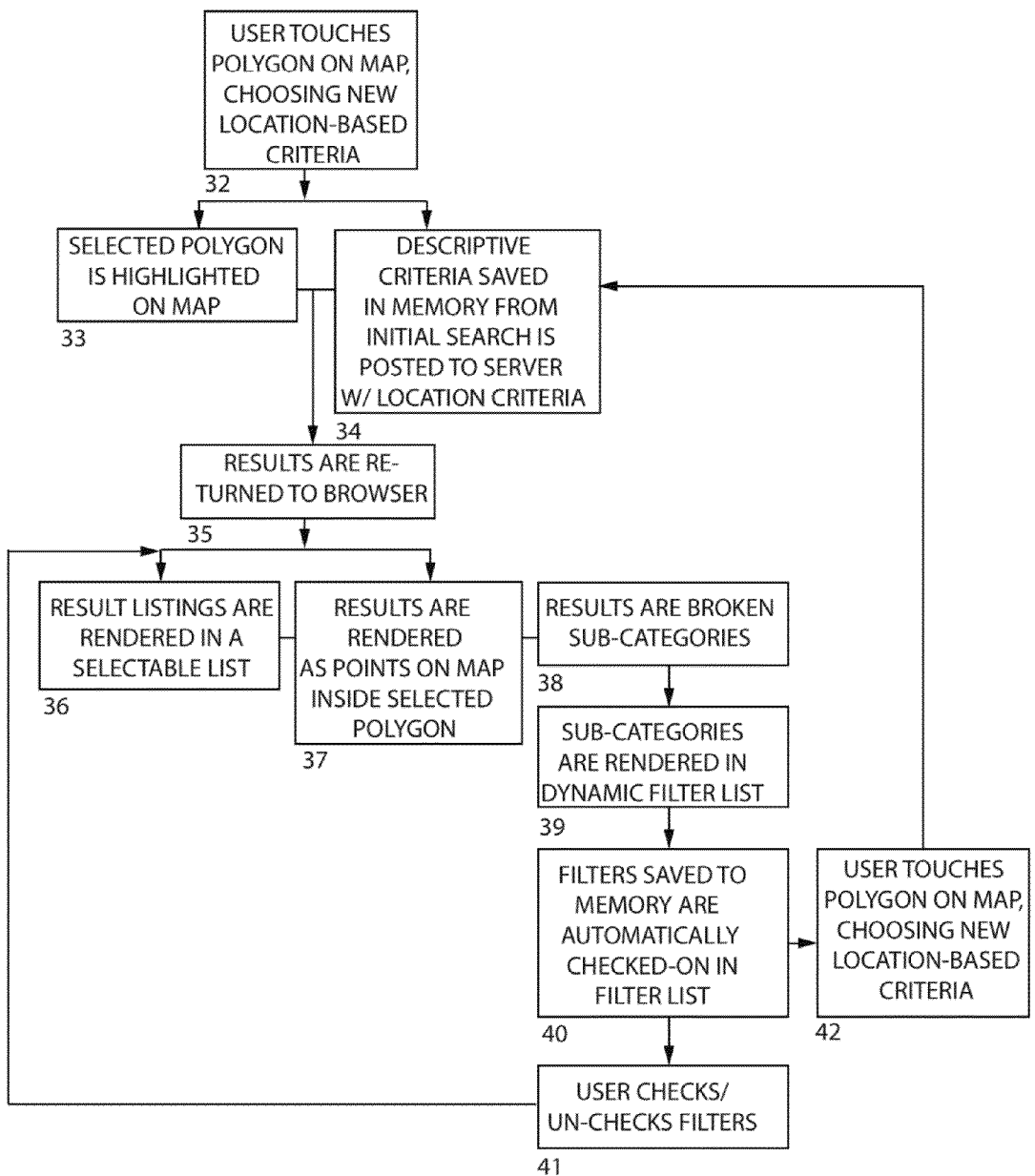
FIG. 7 is a flow diagram showing the sequence involved in subsequent searches in accordance with various embodiments of the present innovation.

After running an initial search, any selected filters 20 are saved in memory for use in subsequent queries of other regions as represented by polygons 6. Thus, referring to FIG. 7, touching the map 32 in a subsequent search selects and highlights a new polygon 33 and fires a query 34 that sends a new request to the server 1 (sending the initial descriptive criteria). Given that the query that was just sent to the server 1 still reflects the more vague criteria of the initial search, a larger universe of list results will be returned 35. Just like the initial search, the results of the subsequent search are simultaneously rendered in a selectable list 36, drawn as points on the map inside the selected polygon 37, and analyzed and broken into smaller sub-categories 38 to dynamically generate the filter list 39. In the case of the subsequent search, though, any filters saved to memory 20 are now automatically checked-on in the filter list 40 and applied to the larger universe of results 35, immediately refining the display of results as per the pre-selected filters 20. If, in turn, a user wishes to modify the chosen filters s/he can easily do so by just checking on/off the list of filters in the drop-down dynamic filter list 41. The same process can then be repeated for any other areas on the map just by touching another polygon to select another region 42. This makes highly refined searches across a large geographic area very efficient, fast and user-friendly.

CONCLUSION

The programming believed necessary to effectuate the processes performed by the computing system 60 in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for providing enhanced web-based mapping services and functions on a touch-screen computing device 62 or the like. In particular, the method and mechanism perform mapping services and functions in a manner more suitable to touch-based inputting functionality inherent in such a touch-screen computing device 62 or the like. Thus, map searching and other mapping chores are performed with the touch-screen computing device 62 in a more organic and intuitive manner.

It should be appreciated that changes could be made to the embodiments described above without departing from the innovative concepts thereof. For example, although the present innovation is set forth primarily in terms of employing point and polygon layers, other types of layers may alternately be employed. Likewise, although the present innovation is set forth primarily in terms of map searching for business-related entities, other types of entities may also be searched in a similar manner. Moreover, although the present innovation is set forth primarily in terms of a touch device 62, it is envisioned that other types of non-keyboard-based devices may also be employed. It should be understood, therefore, that this innovation is not limited to the particular embodiments disclosed, but it is intended to cover modifications within the spirit and scope of the present innovation as defined by the appended claims.

The invention claimed is:

1. A method employed with regard to a touch screen computing device having a processor, a memory, and a touch display, the memory for storing instructions, the processor for retrieving the instructions from the memory and executing the retrieved instructions, the touch display for receiving inputs as touch-based gestures imparted directly on the touch display by a user and sensed by the touch display, the instructions comprising actions taken by the computing system to implement the method including:

displaying a map on the touch display of the device;

overlaying the displayed map on the touch display with a map-based graphical user interface (GUI), the GUI providing a translucent view corresponding to the displayed map, the view being associated with a particular dataset, the GUI also providing interlocked queries and analysis tools to probe the dataset, the view comprising a polygon layer corresponding to the displayed map and a point layer corresponding to the displayed map, the polygon layer and the point layer working in tandem to simultaneously display both aggregated and disaggregated data across the displayed map;

the point layer overlaying the displayed map and showing for each of a plurality of specific items a location of the specific item on the displayed map, each shown item being tied to and listed in a selectable point list displayed by the GUI on the display;

the polygon layer overlaying the displayed map and showing a thematic display of information aggregated to distinct regions on the displayed map, the aggregated information for each region being derived from the items in the point layer located on the displayed map within the region;

receiving at the touch display from the user a selection of one of the regions of the polygon layer;

submitting a request to a remote service administering the dataset for items in the dataset that reside in the selected region;

receiving from the remote service in response to the request the items in the dataset that reside in the selected region; and rendering the received items as points in the point layer, the rendered points being bounded by the selected region, the method further comprising:

generating a filter list dynamically from the received items, the filter list including multiple categories relating to the received items;

presenting the generated filter list to the user on the touch display as a plurality of selectable categories;

receiving at the touch display from the user a selection of one or more of the selectable categories in the generated filter list;

determining which of the received items match the selected categories;

rendering the matching received items as points in the point layer, the rendered points being bounded by the selected region and representing entities which match the selected categories; and displaying the matching received items in a selectable list, the displayed items in the selectable list being bounded by the selected region and representing entities which match the selected categories, the received items including information from the remote service relating to predetermined categories to which the received items are assigned, the method further comprising generating the filter list dynamically the received items, the filter list including the categories to which the received items are assigned.

2. The method of claim 1 comprising one of receiving at the touch display a touch selection of a region from the polygon layer and thereafter automatically populating a text input box with a location name corresponding to the touch-selected region, and receiving in a text input box on the touch display a location name and thereafter automatically selecting a corresponding region from the polygon layer.

3. The method of claim 1 wherein the received items include information from the remote service relating to predetermined categories to which the received items are assigned, the predetermined categories including size ranges relating to the received items and item types relating to the received items, the method further comprising generating a filter list dynamically from the received items, the filter list including the size ranges and item types of the received items.

4. The method of claim 1 further comprising receiving at the touch display from the user descriptive criteria relating to an area of interest of the user, and comprising:

submitting a request to a remote service administering the dataset for items in the dataset that reside in the selected region and that match the received descriptive criteria;

receiving from the remote service in response to the request the items in the dataset that reside in the selected region and that match the received descriptive criteria; and rendering the received items as points in the point layer, the rendered points being bounded by the selected region and representing entities which meet the received descriptive criteria.

5. The method of claim 1 further comprising receiving at one of a text input box and a drop-down list on the touch display from the user descriptive criteria relating to an area of interest of the user, and comprising:

submitting a request to a remote service administering the dataset for items in the dataset that reside in the selected region and that match the received descriptive criteria;

receiving from the remote service in response to the request the items in the dataset that reside in the selected region and that match the received descriptive criteria; and rendering the received items as points in the point layer, the rendered points being bounded by the selected region and representing entities which meet the received descriptive criteria.

6. A method employed with regard to a touch screen computing device having a processor, a memory, and a touch display, the memory for storing instructions, the processor for retrieving the instructions from the memory and executing the retrieved instructions, the touch display for receiving inputs as touch-based gestures imparted directly on the touch display by a user and sensed by the touch display, the instructions comprising actions taken by the computing system to implement the method including:

displaying a map on the touch display of the device;
overlaying the displayed map on the touch display with a map-based graphical user interface (GUI), the GUI providing a translucent view corresponding to the displayed map, the view being associated with a particular dataset, the GUI also providing interlocked queries and analysis tools to probe the dataset, the view comprising a polygon layer corresponding to the displayed map and a point layer corresponding to the displayed map, the polygon layer and the point layer working in tandem to simultaneously display both aggregated and disaggregated data across the displayed map;
the point layer overlaying the displayed map and showing for each of a plurality of specific items a location of the specific item on the displayed map, each shown item being tied to and listed in a selectable point list displayed by the GUI on the display;
the polygon layer overlaying the displayed map and showing a thematic display of information aggregated to distinct regions on the displayed map, the aggregated information for each region being derived from the items in the point layer located on the displayed map within the region;
receiving at the touch display from the user a first selection of one of the regions of the polygon layer;
submitting a first request to a remote service administering the dataset for first items in the dataset that reside in the first selected region;
receiving from the remote service in response to the first request the first items in the dataset that reside in the first selected region;
rendering the received first items as points in the point layer, the rendered points being bounded by the first selected region;
generating a filter list dynamically from the received first items, the filter list including multiple categories relating to the received first items;
presenting the generated filter list to the user on the touch display as a plurality of selectable categories;
receiving at the touch display from the user a selection of one or more of the selectable categories in the generated filter list;
determining which of the received first items match the selected categories from the filter list;
rendering the matching received first items as points in the point layer, the rendered points being bounded by the first selected region and representing entities which match the selected categories from the filter list;
receiving at the touch display from the user a second selection of one of the regions of the polygon layer;
submitting a second request to the remote service for second items in the dataset that reside in the second selected region;
receiving from the remote service in response to the second request the second items in the dataset that reside in the second selected region;
determining which of the received second items match the selected categories from the filter list; and
rendering the matching received second items as points in the point layer, the rendered points being bounded by the second selected region and representing entities which match the selected categories from the filter list,
the method comprising:
generating a filter list dynamically from the received first items, the filter list including multiple categories relating to the received first items;
presenting the generated filter list to the user on the touch display as a plurality of selectable categories;
receiving at the touch display from the user a selection of one or more of the selectable categories in the generated filter list;
determining which of the received first items match the selected categories;
rendering the matching received first items as points in the point layer, the rendered points being bounded by the first selected region and representing entities which match the selected categories; and
displaying the matching received first items in a selectable list, the displayed items in the selectable list being bounded by the first selected region and representing entities which match the selected categories,
the received first items including information from the remote service relating to predetermined categories to which the received first items are assigned, the method comprising generating a filter list dynamically from the received first items, the filter list including the categories to which the received first items are assigned.

7. The method of claim 6 comprising one of receiving at the touch display a touch selection of a region from the polygon layer and thereafter automatically populating a text input box with a location name corresponding to the touch-selected region, and receiving in a text input box on the touch display a location name and thereafter automatically selecting a corresponding region from the polygon layer.

8. The method of claim 6 wherein the received first items include information from the remote service relating to predetermined categories to which the received first items are assigned, the predetermined categories including size ranges relating to the received first items and item types relating to the received first items, the method comprising generating a filter list dynamically from the received first items, the filter list including the size ranges and item types of the received first items.

9. A method employed with regard to a touch screen computing device having a processor, a memory, and a touch display, the memory for storing instructions, the processor for retrieving the instructions from the memory and executing the retrieved instructions, the touch display for receiving inputs as touch-based gestures imparted directly on the touch display by a user and sensed by the touch display, the instructions comprising actions taken by the computing system to implement the method including:

displaying a map on the touch display of the device;
overlaying the displayed map on the touch display with a map-based graphical user interface (GUI), the GUI providing a translucent view corresponding to the displayed map, the view being associated with a particular dataset, the GUI also providing interlocked queries and analysis tools to probe the dataset, the view comprising a polygon layer corresponding to the displayed map and a point layer corresponding to the displayed map, the polygon layer and the point layer working in tandem to simultaneously display both aggregated and disaggregated data across the displayed map;

the point layer overlaying the displayed map and showing for each of a plurality of specific items a location of the specific item on the displayed map, each shown item being tied to and listed in a selectable point list displayed by the GUI on the display;

the polygon layer overlaying the displayed map and showing a thematic display of information aggregated to distinct regions on the displayed map, the aggregated information for each region being derived from the items in the point layer located on the displayed map within the region;

receiving at the touch display from the user a selection of one of the regions of the polygon layer;

submitting a request to a remote service administering the dataset for items in the dataset that reside in the selected region;

receiving from the remote service in response to the request the items in the dataset that reside in the selected region;

rendering the received items as points in the point layer, the rendered points being bounded by the selected region;

generating a filter list dynamically from the received items, the filter list including multiple categories relating to the received items;

presenting the generated filter list to the user on the touch display as a plurality of selectable categories;

receiving at the touch display from the user a first selection of one or more of the selectable categories in the generated filter list;

determining which of the received items first match the first selected categories;

rendering the first matching received items as points in the point layer, the rendered points being bounded by the selected region;

receiving at the touch display from the user a second selection of one or more of the selectable categories in the generated filter list;

determining which of the received items second match the second selected categories; and rendering the second matching received items as points in the point layer, the rendered points being bounded by the selected region, the method comprising:

displaying the first matching received items in a selectable list, the displayed items in the selectable list being bounded by the respective selected region and representing entities which match the selected categories, the first matching received items including information from the remote service relating to predetermined categories to which the first matching received items are assigned, the method comprising generating a filter list dynamically from the first matching received items, the filter list including the categories to which the first matching received items are assigned.

10. The method of claim 9 comprising one of receiving at the touch display a touch selection of a region from the polygon layer and thereafter automatically populating a text input box with a location name corresponding to the touch-selected region, and receiving in a text input box on the touch display a location name and thereafter automatically selecting a corresponding region from the polygon layer.

11. The method of claim 9 wherein the received items include information from the remote service relating to predetermined categories to which the received items are assigned, the predetermined categories including size ranges relating to the received items and item types relating to the received items, the method comprising generating a filter list dynamically from the received items, the filter list including the size ranges and item types of the received items.

\* \* \* \* \*